United States Patent
Benedek et al.

(10) Patent No.: US 12,063,920 B2
(45) Date of Patent: Aug. 20, 2024

(54) SYSTEM AND METHOD FOR LOCATING AND ELIMINATING INSECTS

(71) Applicant: BZIGO LTD., Tel-Aviv (IL)

(72) Inventors: Nadav Benedek, Tel-Aviv (IL); Saar Wilf, Tel-Aviv (IL)

(73) Assignee: BZIGO LTD., Tel Aviv (IL)

( * ) Notice: Subject to any disclaimer, the term of this patent is extended or adjusted under 35 U.S.C. 154(b) by 340 days.

(21) Appl. No.: 17/259,205

(22) PCT Filed: Jul. 24, 2019

(86) PCT No.: PCT/IL2019/050839
§ 371 (c)(1),
(2) Date: Jan. 11, 2021

(87) PCT Pub. No.: WO2020/026230
PCT Pub. Date: Feb. 6, 2020

(65) Prior Publication Data
US 2021/0251209 A1    Aug. 19, 2021

Related U.S. Application Data

(60) Provisional application No. 62/743,593, filed on Oct. 10, 2018.

(30) Foreign Application Priority Data

Jul. 29, 2018 (IL) .......................................... 260844

(51) Int. Cl.
*G06V 20/52* (2022.01)
*A01M 1/02* (2006.01)
(Continued)

(52) U.S. Cl.
CPC .............. *A01M 1/026* (2013.01); *A01M 1/06* (2013.01); *A01M 1/223* (2013.01); *G06V 10/40* (2022.01); *G06V 20/52* (2022.01)

(58) Field of Classification Search
CPC ........ A01M 1/026; A01M 1/06; A01M 1/223; A01M 1/14; A01M 1/2022; A01M 5/00;
(Continued)

(56) References Cited

U.S. PATENT DOCUMENTS 4,015,366 A    4/1977 Hall
7,057,516 B2   6/2006 Donskoy et al.
(Continued)

FOREIGN PATENT DOCUMENTS

CN    103914733     7/2014
CN    106940734 A   7/2017
(Continued)

OTHER PUBLICATIONS

Lopez, et al., "Monitoring Pest Insect Traps by Means of Low-Power Image Sensor Technologies," Nov. 13, 2012, Sensors, vol. 12, No. 11, pp. 15801-15819, MDPI, Basel, Switzerland.
(Continued)

*Primary Examiner* — Stephen P Coleman
(74) *Attorney, Agent, or Firm* — AlphaPatent Associates Ltd.; Daniel J. Swirsky

(57) ABSTRACT

Systems and methods are provided for locating an insect in a space and for indicating to a user the location of the insect and/or for eliminating the insect. The system includes a camera to obtain an image of the space and a processor to detect an object by comparing at least two images of the space and determine that the object is an insect based on a characteristic of the object in an image of the space. In some embodiments an independently mobile device may be controlled to eliminate the insect at the location of the insect in the space.

18 Claims, 12 Drawing Sheets

(51) Int. Cl.
*A01M 1/06* (2006.01)
*A01M 1/22* (2006.01)
*G06V 10/40* (2022.01)

(58) Field of Classification Search
CPC .................. A01M 1/226; A01M 2200/012; G06V 10/40; G06V 20/52; G06N 20/00
USPC ......................................................... 382/100
See application file for complete search history.

(56) References Cited

U.S. PATENT DOCUMENTS

| | | | |
|---|---|---|---|
| 7,504,956 | B2 | 3/2009 | Kates |
| 7,656,300 | B2 | 2/2010 | Ronnau |
| 8,705,017 | B2 | 4/2014 | Hyde et al. |
| 9,381,646 | B1 | 7/2016 | Fryshman |
| 9,693,547 | B1 | 7/2017 | Moitier |
| 9,807,346 | B2 | 10/2017 | Afanasyev et al. |
| 9,807,996 | B1 | 11/2017 | Yu |
| 10,081,426 | B2 | 9/2018 | Gordon et al. |
| 2004/0076583 | A1* | 4/2004 | Faeldt ................ G06T 7/0012 382/128 |
| 2005/0025357 | A1 | 2/2005 | Landwehr et al. |
| 2014/0311014 | A1* | 10/2014 | Feugier ............... A01M 1/026 43/107 |
| 2015/0075060 | A1 | 3/2015 | Balsam |
| 2016/0347450 | A1* | 12/2016 | Raniere ................ B60L 53/63 |
| 2017/0223943 | A1* | 8/2017 | Park ..................... A01M 1/026 |
| 2017/0223947 | A1 | 8/2017 | Gall et al. |
| 2017/0231213 | A1 | 8/2017 | Gordon et al. |
| 2018/0046872 | A1 | 2/2018 | Diamond et al. |
| 2018/0075596 | A1* | 3/2018 | Fryshman ............. H04N 23/54 |
| 2018/0204321 | A1 | 7/2018 | Fryshman |
| 2019/0073534 | A1* | 3/2019 | Dvir ...................... G06V 10/56 |

FOREIGN PATENT DOCUMENTS

| | | | |
|---|---|---|---|
| CN | 107041349 A | 8/2017 | |
| CN | 107094734 | 8/2017 | |
| DE | 202014007499 U1 | 11/2014 | |
| JP | 2018061513 | 4/2018 | |
| JP | 2018061513 A * | 4/2018 | |
| WO | WO-2017208354 A1 * | 12/2017 | ............. A01M 1/22 |

OTHER PUBLICATIONS

Author Unknown, "Life Sciences: High-Speed Cameras Capture Mosquito Behavior," Jan. 13, 2016, VisionSystemDesign, http://www.vision-systems.com/articles/print/volume-21/issue-1/departments/technology-trends/life-sciences-high-speed-cameras-capture-mosquito-behavior.html, Endeavor Business Media, LLC. Fort Atkinson, Wisconsin, USA.

Priya, et al., "Monitoring Of Pest Insect Traps Using Image Sensors & Dspic," Sep. 2013, International Journal Of Engineering Trends And Technology, vol. 4, Issue 9, Seventh Sense Research Group, Tiruchirappalli, India.

Amenyo et al., "MedizDroids Project: Ultra-Low Cost, Low-Altitude, Affordable and Sustainable UAV Multicopter Drones For Mosquito Vector Control in Malaria Disease Management", Global Humanitarian Technology Conference (GHTC), 2014 IEEE, Oct. 10-13, 2014, pp. 590-596.

Nguyen et al., "Using a UAV for Destructive Surveys of Mosquito Population", 2018 IEEE International Conference on Robotics and Automation (ICRA), May 21-25, 2018, Brisbane, QLD, Australia.

* cited by examiner

SYSTEM AND METHOD FOR LOCATING AND ELIMINATING INSECTS

CROSS-REFERENCE TO RELATED APPLICATIONS

This application is a U.S. National Phase Application under 35 U.S.C. 371 of International Application No. PCT/IL2019/050839, which has an international filing date of Jul. 24, 2019, and which claims priority and benefit from U.S. Provisional Patent Application No. 62/743,593, filed Oct. 10, 2018, and Israel Patent Application No. 260844, filed Jul. 29, 2018, the contents and disclosure of which are incorporated herein by reference in their entirety.

FIELD

The present invention is in the field of pest control, specifically, using computer vision to detect, locate and eliminate pests, such as flying insects.

BACKGROUND

In homes and other urban spaces, pests, such as flying insects, which share the environment with humans, spread disease, spoil foodstuff and generally cause a nuisance. Control of these pests is usually attempted through exclusion, repulsion, physical removal or chemical means.

A system using an image sensor with a magnifying lens is used to detect pests in a typically agricultural setting, where the image sensor is moved or items are moved in view of the image sensor, to enable surveillance of a large area.

Such a system, which requires a moving camera, is not suitable for in-door use, as people are not interested in a camera constantly moving in their living and/or working space.

Another system that uses an image sensor tracks flying insects in an area of interest defined by a camera and a retroreflective surface spaced apart from the camera. The need to employ a retroreflective surface in addition to a camera, renders this system obtrusive and cumbersome and thus, less likely to be widely installed in homes, offices and other urban spaces.

SUMMARY

Embodiments of the invention provide a system and method for detecting and locating pests, such as flying insects, typically in an in-door environment, to enable effortless and accurate action against pests, typically, in an enclosed environment.

Systems according to embodiments of the invention include a camera and processor to detect and locate pests from images obtained by the camera. The system may operate from a single housing, which includes the camera, and does not require additional elements separate from the single housing, to locate pests. Additionally, the camera of the system does not have to be attached to or embedded within a moveable platform in order to capture usable images. Thus, the system may be easily set up and unobtrusively located in a space such as a room in a house or office or public space such as a theater, a museum etc.

Embodiments of the invention can distinguish an insect from noise and/or from non-insect objects.

In one embodiment the system can provide a mark visible to humans, to indicate a location of the insect in the room, for further action.

Embodiments of the invention provide a variety of types of solutions for acting against pests detected and located from images of the space.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide systems and methods for detecting a location of one or more insect in an enclosed space, such as a room, and indicating the detected location of the insect in the space.

Examples described herein refer mainly to insect pests, especially to flying insects, such as mosquitoes, however, embodiments of the invention may be used to locate other pests as well.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "estimating", "understanding" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1A:
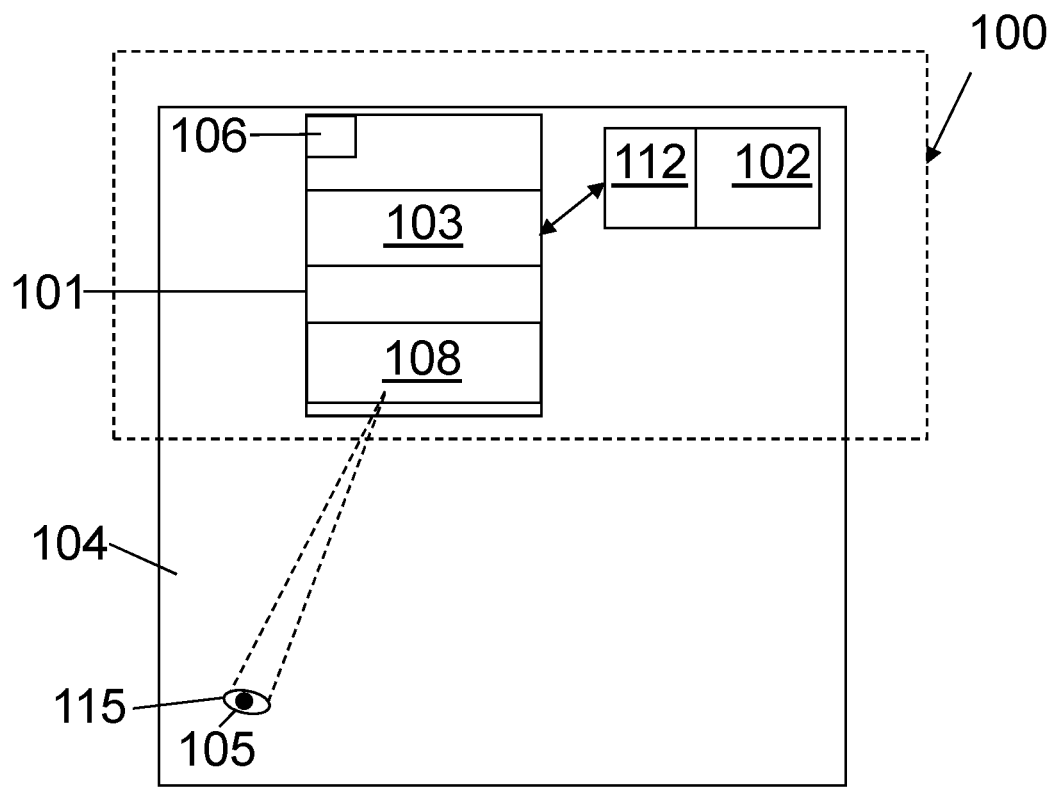
FIG. 1A is a schematic illustration of a system for locating an insect in a space, according to an embodiment of the invention.

In one embodiment, which is schematically illustrated in FIG. 1A, a system 100 for detecting and locating an insect includes a camera 103 to obtain an image of a space, such as, room 104 or portion of the room 104. An insect 105, such as one or more mosquitos, may be in the room 104.

The camera 103, which includes an image sensor and suitable optics, is in communication with a processor 102. Processor 102 receives an image of the room or portion of the room 104, obtained by camera 103, and detects the location of insect 105 in the image of the room. Based on the location of the insect 105 in the image, processor 102 generates a signal to enable creation of a location indicator, which is visible to a human eye, to indicate the location of the insect 105 in the room 104.

The processor 102 may determine the location of the insect 105 in a space (e.g., room 104) based on an image of the space and may control a projector device to direct a light source to create an indication visible to a human eye, in vicinity of the location of the insect in the space.

In the example illustrated in FIG. 1A, the location indicator is a visual mark 115 at the location of the insect 105 in the room 104. The visual mark 115 is created, in one embodiment, via projector 108 that projects a laser or other beam to the vicinity of the insect 105, in the room 104, forming, in vicinity of the location of the insect in the room, a visual mark 115.

Some or all of the components of system 100 are attached to or enclosed within a housing 101. Thus, for example, camera 103 and processor 102 may be both included within a single housing 101. In other embodiments some of the components of the system (e.g., processor 102) are remotely located.

Housing 101, which may be made of materials practical and safe for use, such as plastic and/or metal, may include one or more pivoting element such as hinges, rotatable joints or ball joints, allowing for various movements of the housing 101. For example, housing 101 can be stationed at one location in room 104 but can enable several fields of view (FOV) to camera 103, which is encased within the housing 101, by rotating and/or tilting the housing 101. However, housing 101 typically provides stability for camera 103 such that the camera is not moved while obtaining images.

In some embodiments, the camera 103 is positioned such that its focal plane is parallel to a surface in the room 104. For example, a surface in the room may include the floor or ceiling of the room or a wall or surface of a furniture in the room, etc.

In one embodiment processor 102 detects the location of the insect 105 in the image on a surface in the room (e.g., on a wall, ceiling, surface of a furniture in the room, etc.) and generates a signal to enable creating the visual mark 115 at the location of the insect 105 on the surface.

In some embodiments, the processor 102 detects a stationary (e.g., not flying) insect in an image of the room and the visual mark 115 is formed or directed to the location of the stationary insect.

In some embodiments, the processor 102 detects an alighting insect, e.g., the processor detects the insect flying and then settling down. The processor 102 then detects the location of the insect after alighting, e.g., after settling down, and the visual mark 115 is formed or directed to the location of the insect after alighting.

The camera 103 may include an image sensor, e.g., an appropriate chip such as a CCD or CMOS chip and may be a 2D or 3D camera. The camera 103 may include lenses and/or other optics to enable obtaining an image of the room (or part of the room) 104.

In some embodiments camera 103 includes an infrared (IR) sensitive sensor and/or may include lenses and/or filters to filter out other wavelengths to eliminate noise, to enable obtaining images of room 104 in special illumination conditions. For example, system 100 may include an IR illumination source 106. IR illumination source 106 may include an LED or other illumination source emitting in a range of about 750-950 nm. In one example illumination source 106 illuminates at around 850 nm. IR illumination source 106 can enable use of system 100 even in a dark room by providing illumination that is not visible and/or irritating to the human eye but which enables camera 103 to obtain meaningful images of a dark room.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

In some embodiments system 100 may include a warning device, e.g., a sound emitting device and/or a light source, such as a dedicated LED, and processor 102 may generate a warning signal, such as to cause a sound or light to be emitted, based on detection of the location of the insect.

In some embodiments, processor 102 is in communication with one or more memory unit(s) 112. Memory unit(s) 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Components of system 100 may be connected to each other wirelessly, e.g., via suitable network hubs, or via appropriate cabling or suitable ports such as USB.

According to some embodiments, at least some of the images obtained by camera 103 are stored in memory 112. Memory 112 may further store executable instructions that, when executed by the processor 102, facilitate methods as described herein.

Figure 1B:
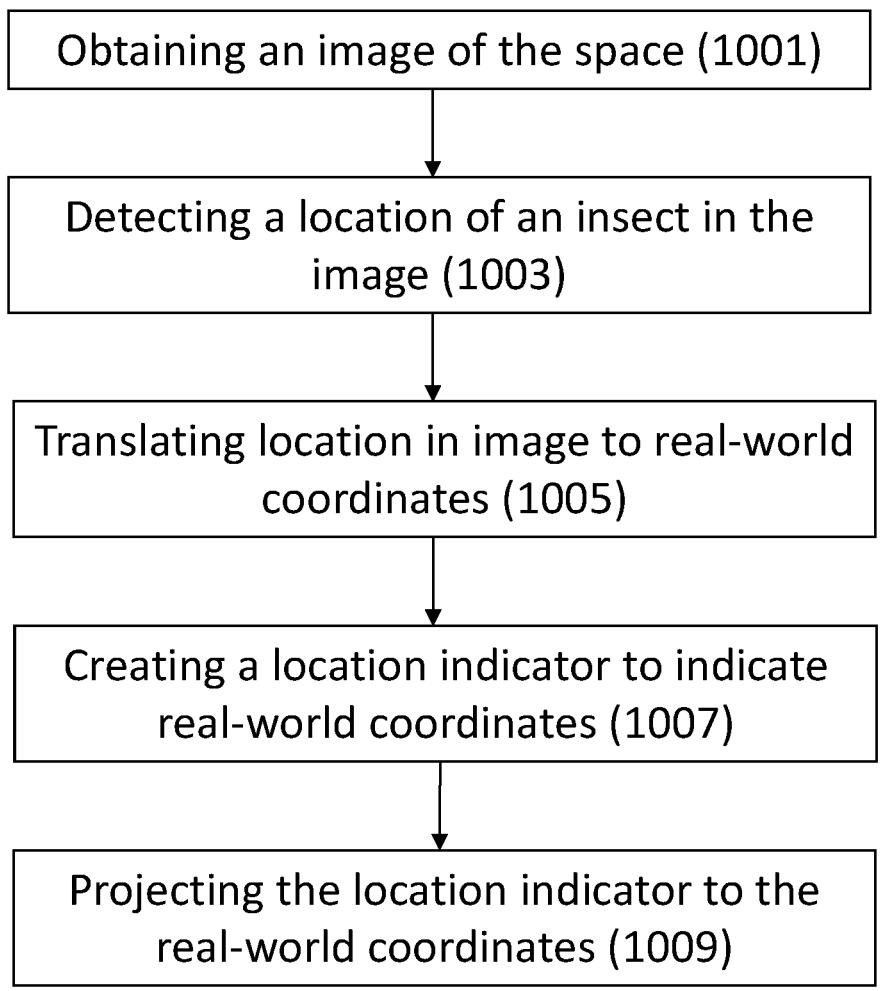
FIG. 1B is a schematic illustration of a method for detecting and locating an insect in a space, according to an embodiment of the invention.

One example of a method, some steps of which are carried out by processor 102, is schematically illustrated in FIG. 1B. The method, for detecting and locating an insect in an enclosed space, includes the steps of obtaining an image of the space (1001), for example, room 104, and detecting a location of an insect in the image (1003). The location of the insect in the image is translated to real-world coordinates (1005) and a location indicator is created to indicate the real-world coordinates (1007).

In some embodiments, once a location of an insect is detected, a signal is generated to notify a user. The signal may be sent (e.g., via Bluetooth, radio, etc.) to a user's mobile device (such as the user's mobile phone or to a dedicated device).

In one embodiment, the method includes detecting a stationary insect (e.g., an insect not flying and/or not changing locations in the space) in the image of the space and detecting the location of the stationary insect. A location indicator is created to indicate real-world coordinates of the stationary insect.

In another embodiment, the method includes detecting an alighting insect in images of the space and detecting the location of the insect after alighting. A location indicator is created to indicate real-world coordinates of the insect after alighting.

In one embodiment the method includes projecting the location indicator (e.g., a beam of light visible to the human eye, such as, a visible light laser beam) to the location of the real-world coordinates in the space (1009) such that a visible mark is created at the location in space. For example, if an insect (e.g., a stationary insect and/or an insect after alighting) is detected at a location on a surface in the space, the beam of light is directed at the location on the surface such that a circle (or other shape) of light on the surface marks the location of the insect.

The location of the insect in the image can be translated to real-world coordinates (step 1005) by using projective geometry, for example, if the focal plane of the camera obtaining the image is parallel to a surface in the space on which the insect is located.

Figure 3:
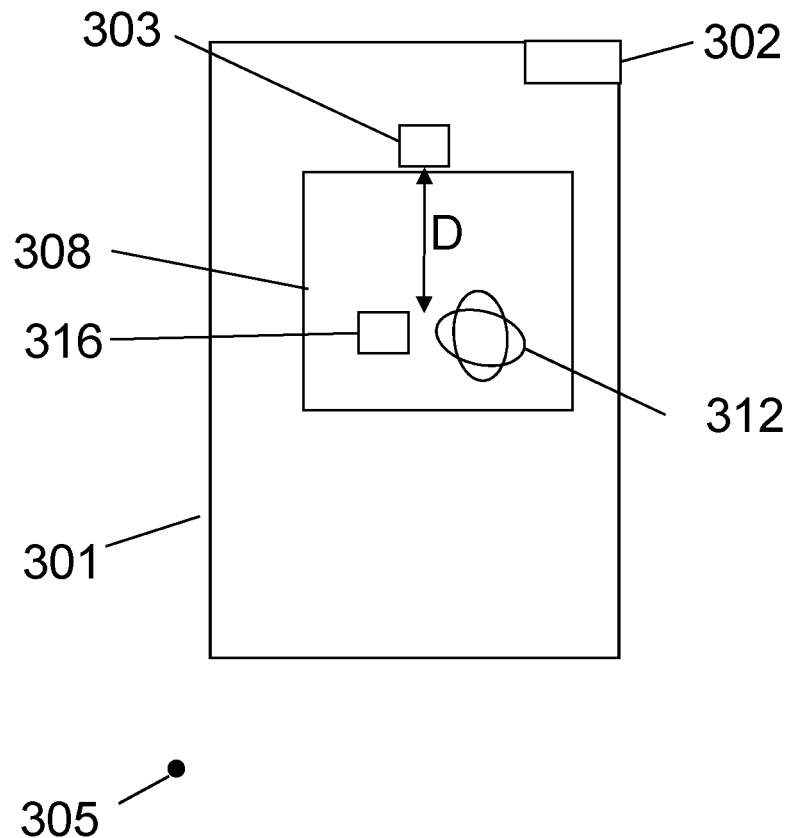
FIG. 3 is a schematic illustration of a system including a projector of a visual mark, according to an embodiment of the invention.

In another embodiment a system, which includes an imager (e.g., camera 103) and projector (e.g., projector 108) may be pre-calibrated. For example, the projector may be positioned in close proximity to the camera (for example see distance D described with reference to FIG. 3 below). During calibration a ray visible to the camera may be projected from the projector to several locations within the space and may be imaged by the camera at those locations. This way, by using interpolation, each location in the image (e.g., each pixel or group of pixels) can be correlated in real-time to an x,y coordinate in the space such that the projector can be directed to locations in the space based on locations detected in the image. Alternatively or in addition, using a ray visible to the camera can enable correcting the direction of the projector in real-time based on the visible indication.

In one embodiment, the projector includes one or more rotor to enable projection of a location indicator at different angles. In this case, each location in the image can be correlated to a, (3 coordinates of the rotor, based on pre-calibration.

In one example, rotors may include a step motor, such that the change in angle is known for each step. One or more physical stops may be used such that the angles of the rotor, at the limits of its movement, are known. For known camera's optics, each pixel can be correlated to a known angle. Thus, the number of steps required to direct the rotor at each angle can be calculated. Since the projector is typically not located at the same location as the camera, the calculations may require adjustment to the distance between the projector and the camera.

Other methods may be used to translate the location of the insect in the image to the real-world location.

Figure 2A:
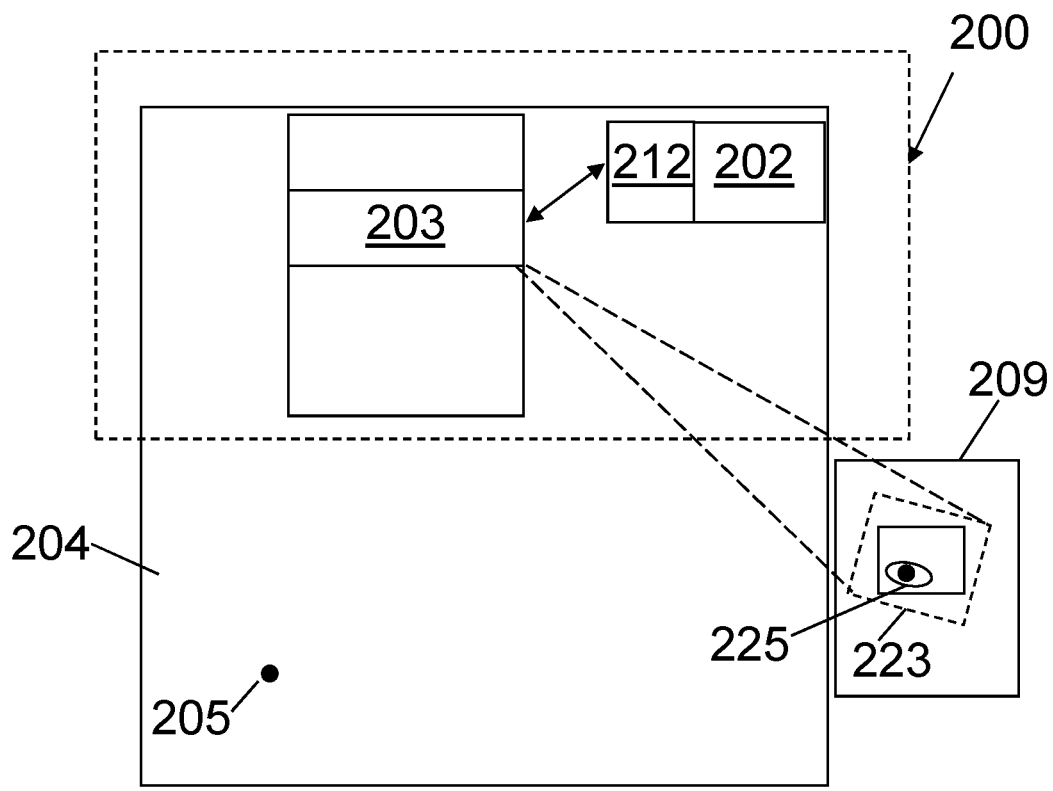
FIGS. 2A and 2B are schematic illustrations of a system for locating an insect in a space, according to another embodiment of the invention.

In another embodiment, which is schematically illustrated in FIG. 2A, system 200 detects an insect, e.g., as described herein, and creates a location indicator, which is visible in an image of the room. In this embodiment, processor 202 locates an insect 205 in an image 223 of the room and generates a signal to create a location indicator 225 in the image 223 at the location of the insect. In one example, the image 223 of the room is displayed together with the location indicator 225, which may be an icon or other graphic indication superimposed on the image 223.

Figure 2B:
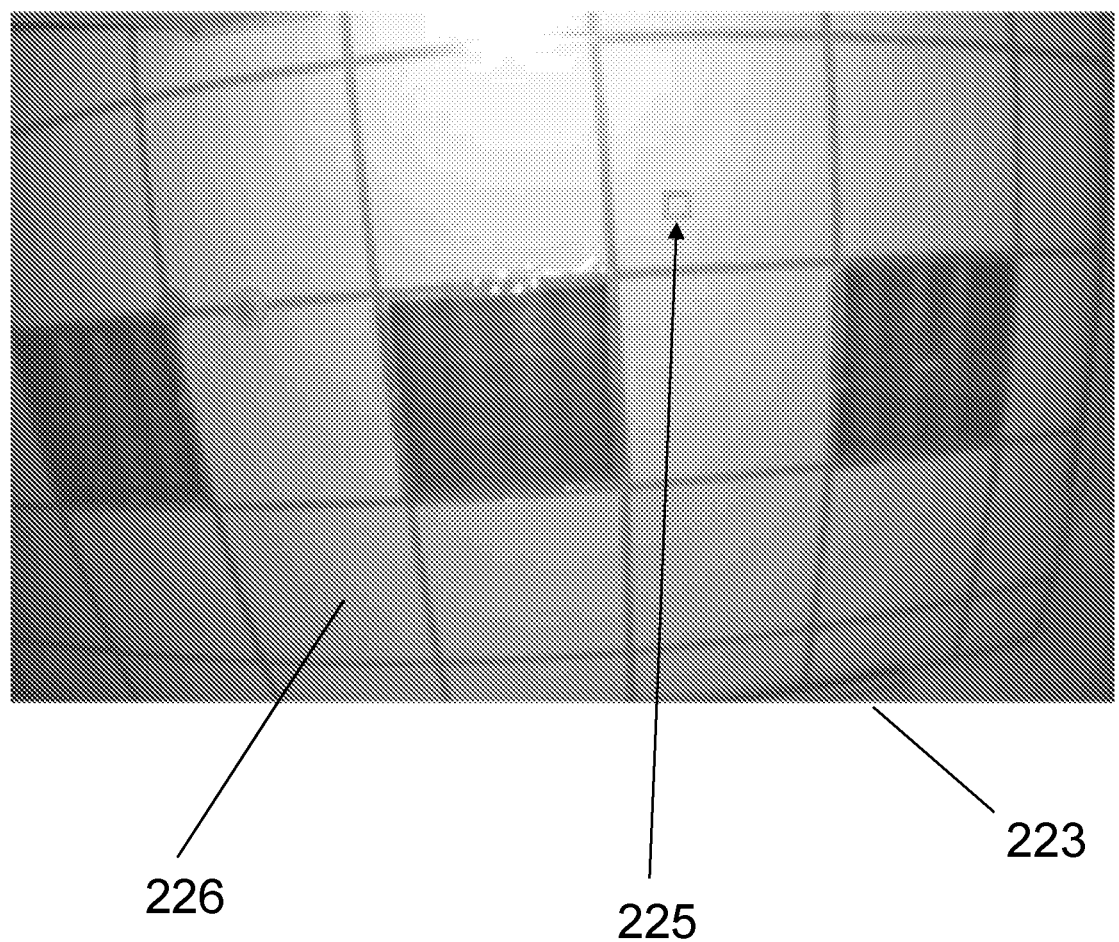

An example of an image 223 of a room is shown in FIG. 2B. Image 223, which includes part of a room, shows a surface, namely ceiling 226 of the room, on which an insect is located. A location indicator 225 is superimposed on the image 223 to indicate to a user viewing image 223, the location of the insect on the ceiling 226.

In one embodiment, images obtained by camera 203 can be stored locally (e.g., in memory unit 212) and/or remotely (e.g., the images may be transmitted over the internet or by using another suitable wireless communication, to remote storage, e.g., on the cloud). The images may then be retrieved and displayed on a device 209, such as a personal and/or mobile device (e.g., smartphone, tablet, etc.) or on a dedicated, typically mobile, device.

In one embodiment the image 223 of the room is an image of the room in real-time and the location indicator 225 is superimposed on the same image in which the location of insect 205 is detected.

In some embodiments, the image 223 of the room is manipulated such that certain details (such as personal, private and/or confidential information) are obscured or removed from the image. Thus, a real-time image (the same image in which insect 205 is detected) can be displayed without compromising privacy and/or confidentiality. The image 223 can be manipulated to protect privacy and/or confidentiality by processor 202 or by a different processor (e.g., a processor in device 209).

In another embodiment, a set of images of the room is obtained by camera 203. Camera 203 is not moved or repositioned while obtaining the set of images such that all the images capture the same field of view. A first image may be an image of the room 204 only, with no occupants, whereas a second image of the room 204 may be a real-time image of the room (possibly with occupants) in which an insect 205 is detected. In some embodiments, in order to protect the privacy of the occupants, only the first image is transmitted to device 209 to be displayed and the location of the insect 205 in the second image, is indicated and displayed on the first image, which is the image being displayed to the user.

In some embodiments, the first image (which typically does not include personal information) may be an image chosen by a user from a set of images of the room. In other embodiments, the first image may be a modified or manipulated image of the room in which personal information is obscured by modifying the personal information in the image.

In some embodiments, the first image may be a representative image, which enables a user to understand the layout of the space being imaged but is not necessarily a real image of the space. For example, a representative image may be created from a combination of several images of the space, typically obtained by camera 203. For example, the representative image may be an average of several images from a set of images of the space. In another example, a representative image may include a graphic representation of the space but not the actually imaged components of the space. In addition to being useful in protecting personal information, using an average image (or other representative image) as a first image, may be useful in case the camera (e.g., camera 203) is repositioned between images, such that the images are not all of exactly the same field of view.

Figure 2C:
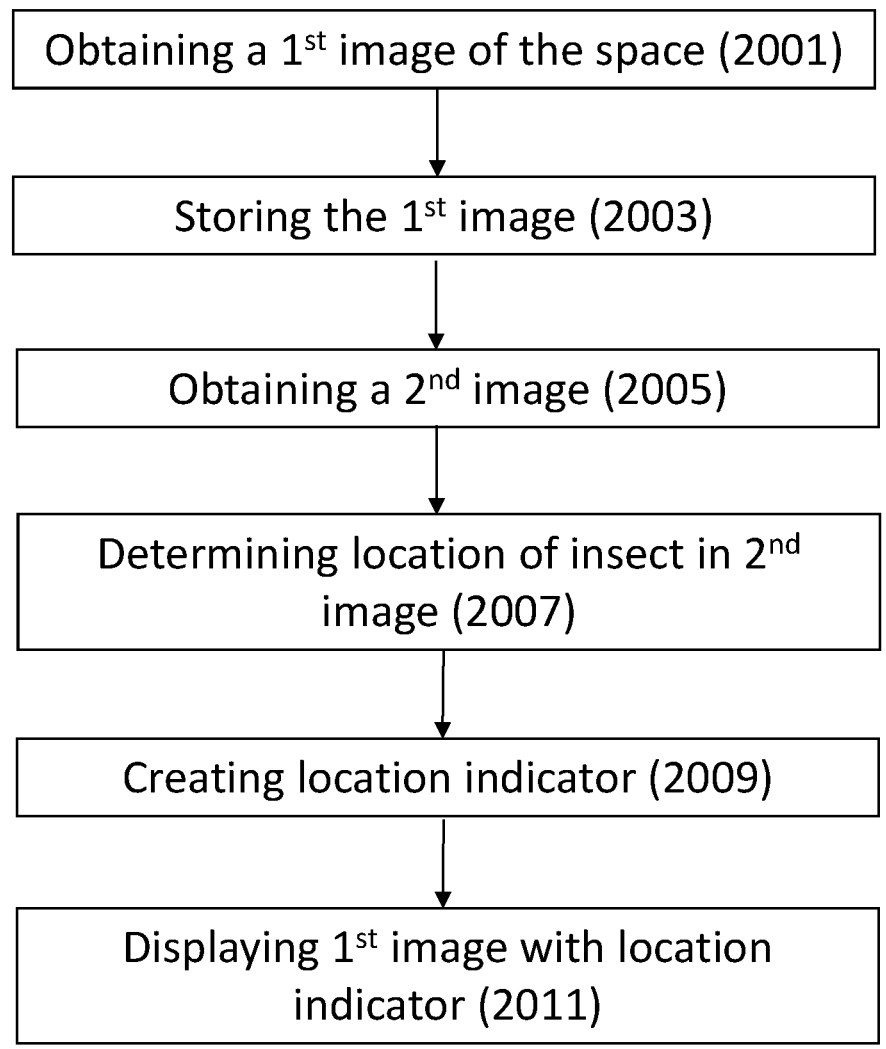
FIG. 2C is a schematic illustration of a method for detecting and locating an insect in a space, according to another embodiment of the invention.

In one embodiment, a method for detecting and locating an insect, carried out by processor 202, includes visually marking a location of an insect in the space on an image of the space. An exemplary method, which is schematically illustrated in FIG. 2C, includes obtaining a first image of a space (2001) and storing the first image (2003). Typically, the first image includes the space empty of occupants and/or in which personal information is obscured.

A second image of the space is obtained (2005). The second image is of about the same field of view as the first image but is obtained at a later time than the first image. The second image includes an insect in the space. The location of the insect in the second image is determined (2007) and a location indicator (e.g., a graphic mark) is created to mark that location in an image of the space (2009).

In one embodiment, the location indicator marks the location on the same image in which the insect was detected. In other embodiments, the location indicator marks the location on a different image of the room. The different image of the room may be an image captured at an earlier time, e.g., the first image of the room.

In some embodiments the method includes accepting input from a user and determining which image to use as a first image (namely, which image to display together with the location indicator) based on the input from the user. Thus, a user can choose an image to send to storage and/or display, which does not include information which the user regards as personal or private.

In other or additional embodiments, the method includes a step of creating a representative image of the space (e.g., an average image) and using the representative image as the first image.

In some embodiments the first image is retrieved from storage and displayed to a user, e.g., on the user's personal mobile device or on a dedicated device, with the location indicator superimposed on it, at the same location as in the second image (2011).

Thus, for example, a grid may be used on all the images of the space which are of the same field of view (or about the same field of view), such that a location of the insect in one image can be given x,y coordinates of the grid which are the same x,y coordinates in all the other images of the same field of view.

As discussed above, and as further exemplified in FIG. 3, a projector 308 may be controlled by processor 302 to project or direct a location indicator to the location of the insect in the real-world space, e.g., room 104.

In one embodiment, a projector 308 and a camera 303 are arranged in close proximity within housing 301. The projector 308 includes an indicator source, e.g., a light source, such as laser 316 and an indicator directing device 312, such as an optical system, including lenses and/or mirrors or other optical components to direct light from the light source in a desired direction or angle. In one embodiment, the indicator directing device 312 includes rotating optical elements such as a mirror-bearing gimbal arranged to pivot about a single axis. A set of two or three such gimbals, one mounted on the other with orthogonal pivot axes, may be used to allow the light of laser 316 to be directed in any desired pitch, roll and yaw.

Based on the detected location of the insect 305 in an image obtained by camera 303, processor 302 controls indicator directing device 312 such that the indicator, e.g., laser 316, is directed to the real-world location of the insect. For example, control of the yaw, and pitch of the gimbals of indicator directing device 312 enables directing an indicator, such as laser 316, to a real-world location.

Typically, camera 303 is located at a minimal distance D from the projector 308 (or from components of the projector such as the laser and/or indicator directing device) to enable accurate aim of the indicator. In one example, camera 303 and laser 316 or indicator directing device 312 are located less than 20 cm of each other. In another example, camera 303 and laser 316 or indicator directing device 312 are located less than 10 cm of each other.

The laser 316 may include visible light such that the mark created by the laser at the detected location of the insect is visible and can be imaged by camera 303 and displayed to a user, for example on device 209. Thus, in one embodiment a user may receive an image of a room with a visual indication of the location of the insect created by laser 316, in the image of the room.

In one embodiment, the projector 308 is configured to eliminate or incapacitate the insect 305. For example, laser 316 may be a UV or IR or other light at high enough power such that when directed at an insect 305 on a surface in the room or at a stationary insect or at an insect after alighting, it may disable and/or kill insect 305.

In some embodiments, projector 308, which includes an indicator source, e.g., a light source, such as laser 316 and an indicator directing device 312 controlled by a processor, may be used in fields other than pest control. For example, projector 308 may be used to produce visual effects, such as animation. For example, projector 308 may be part of a toy. In some embodiments, the processor controlling the directing device receives input from an image sensor and/or based on image processing and can be used in virtual reality games or other applications.

In another embodiment, projector 308 may be used as a directing device, for example, to direct users to a specific point in an enclosed or other space. A few examples include:
directing security forces to a location identified by security cameras;
directing a user to a desired location in large spaces such as archives, stores or warehouses;
directing construction or maintenance staff to a specific site where a problem is detected (possibly, the problem is detected via image processing); and
operating a laser cutting machine based on image processing.

Some embodiments of the invention provide devices for handling insects, such as eliminating or incapacitating the insects. Such a device may also include an apparatus such as an additional camera and/or illumination source, to assist in confirming the insect, e.g., confirming the existence and/or type of insect in an image. The devices, which are typically moveable, are controlled to approach a location of an insect in a space, such as an enclosed space, to handle the insect at close range, thereby limiting effects that may be hazardous to the surrounding space.

Some examples of devices for handling insects, which are described below, are devices controlled by systems for locating insects according to embodiments of the invention, however, in some embodiments, the devices for handling insects may be controlled by other systems.

The systems as described above may include, in some embodiments, an auxiliary device to be used, together with the systems described herein, to eliminate and/or otherwise handle insects detected in images, according to embodiments of the invention.

Figure 4A:
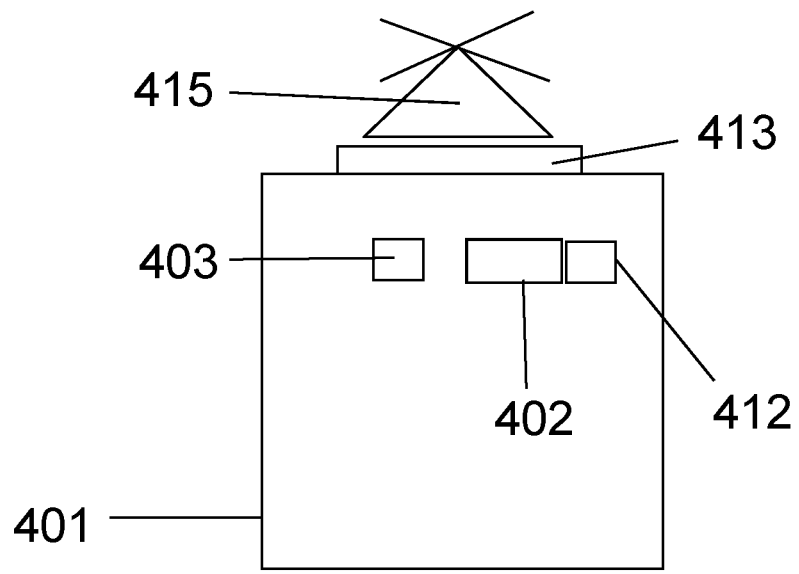
FIGS. 4A and 4B are schematic illustrations of systems including an auxiliary device for handling an insect, according to embodiments of the invention.
Figure 4B:
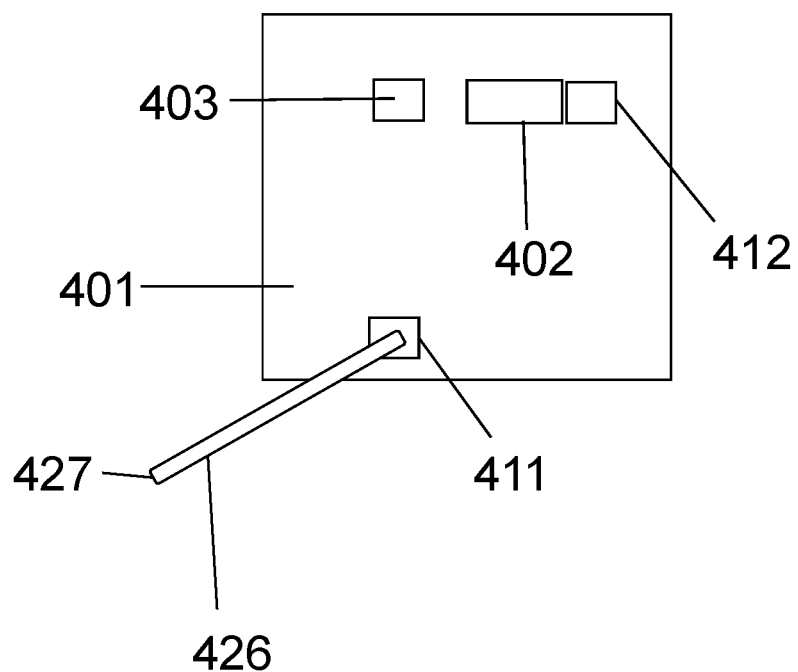

In exemplary embodiments, which are schematically illustrated in FIGS. 4A and 4B, a system for detecting a location of an insect in a room includes a housing 401 which encases a camera 403 used to obtain an image of a space (such as a room in a house, office space and other public or private indoor spaces). Camera 403 is in communication with a processor 402 and memory 412, e.g., as described above. The system further includes an auxiliary device in communication with processor 402.

Figure 5:
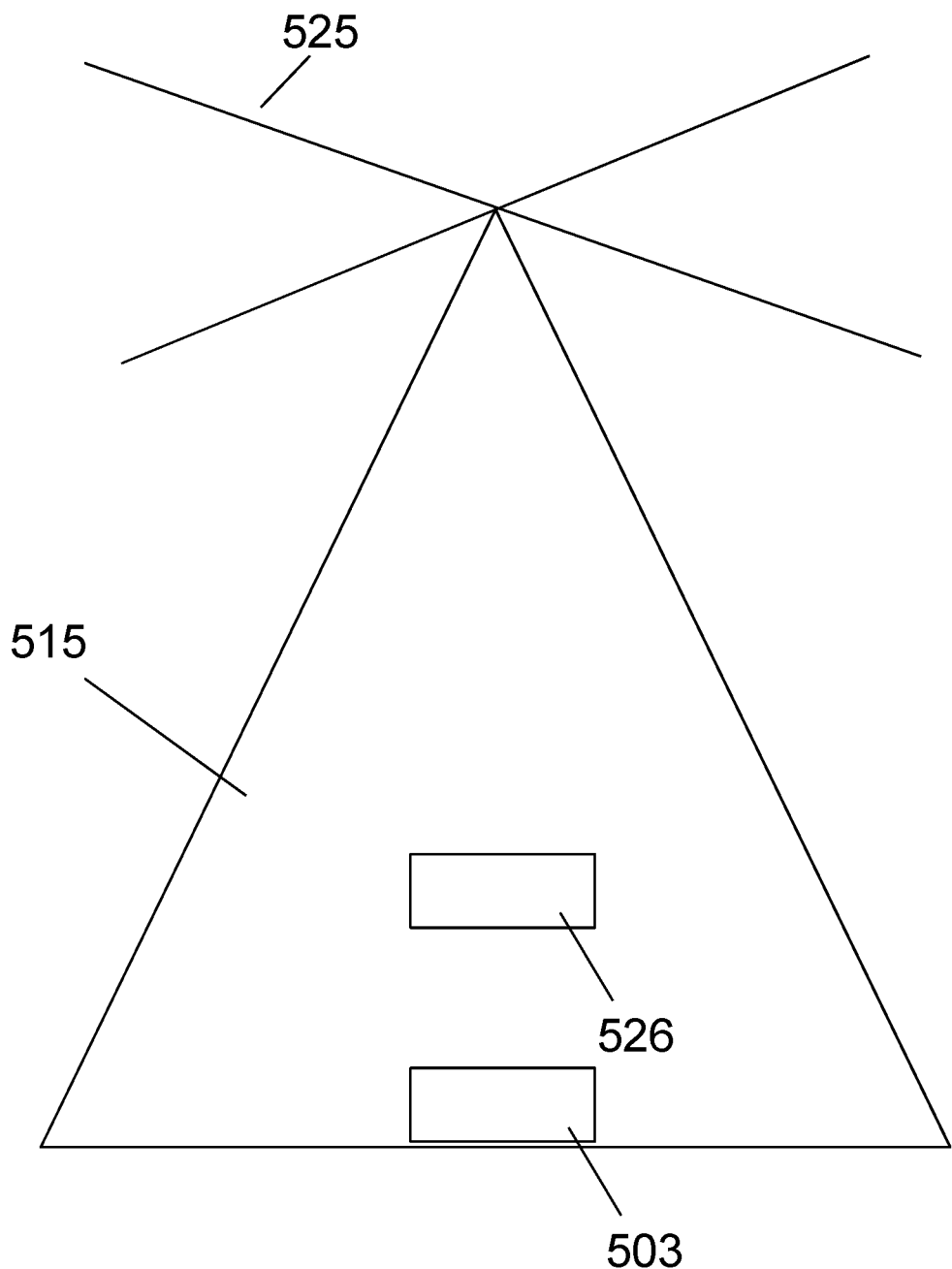
FIG. 5 is a schematic illustration of an auxiliary device for handling an insect, according to an embodiment of the invention.

In FIG. 4A, the auxiliary device is an independently mobile device 415, which may be used to eliminate an insect or for other purposes, such as to remove, capture or analyze the insect, as further described in FIG. 5.

The system described in FIG. 4A may also include a port 413, typically on housing 401, such as a docking station or other terminal for powering and/or loading the independently mobile device 415.

In one embodiment, the independently mobile device 415 is a flying device such as a drone.

Independently mobile device 415 may be remotely controlled by processor 402. For example, independently mobile device 415 may be in wireless communication (e.g., via Bluetooth, radio, etc.) with processor 402.

The system schematically illustrated in FIG. 4A includes a camera 403 to obtain images of a space and a mobile device 415 that is separately mobile from the camera 403. The processor 402 may detect an insect in at least one of the images of the space obtained by camera 403 and may control the device 415 to move to vicinity of the insect, based on analysis of the images of the space.

In one embodiment, processor 402 controls the mobile device 415 to move to the vicinity of the insect, based on analysis of an image of the space having the insect and the mobile device 415 within a single frame. Processor 402 may control the mobile device 415 to move in a direct path from the camera 403 in the direction of the insect, wherein the direction to the insect can be estimated from the location of the image of the insect within the frame. Once the insect and the mobile device 415 are within the same frame, processor 402 further controls movement of mobile device 415, such that it stays in the vicinity of the insect in the image, while guiding it away from the camera and towards the insect. For example, processor 402 may periodically determine the angular distance of the mobile device 415 from the insect in the frame, which may be estimated using the distance, in pixels, between the two objects in the frame. If the determined angular distance is above a predetermined value, the processor 402 may calculate the distance and direction needed to move the mobile device 415 in order to bring it within the predetermined angular distance from the insect, and may cause the mobile device 415 to move the calculated distance in the calculated direction.

This process may be repeated until the mobile device 415 is within a predetermined distance, e.g., an elimination distance, from the insect. For example, an elimination distance may be a distance from which the device can effectively handle the insect, for example, the distance from which an insecticide can be effectively sprayed on the insect. Once the predetermined distance (e.g. elimination distance) is reached, device 415 and/or member 426 (described below) may be controlled to eliminate the insect, e.g., by using chemical, mechanical or electrical methods.

Thus, processor 402 estimates a direction of the insect from the camera 403 and controls the device to move approximately in that direction.

In one embodiment, determining whether an elimination distance was reached, can be done by utilizing an additional camera on the mobile device 415 to obtain an image of the insect. The image of the insect may be analyzed (e.g. by comparing its size in the image to an expected size of this type of insect from the desired distance). In another embodiment, a processor (e.g., processor 402 or another processor, which may be attached to mobile device 415) may be in communication with a rangefinder or similar system (which may be attached to the mobile device 415 or at another location within the system) to determine, based on input from the rangefinder, whether an elimination distance was reached. In another embodiment, determining whether an elimination distance was reached can be done by the mobile device 415 emitting light in a known direction (e.g. using a laser pointer or other projector) to obtain a point of light and analyzing the location of the point of light in an image from camera 403 (e.g. a point on a wall or ceiling created by the laser pointer). The location of the mobile device 415 relative to camera 403 is known (as described herein). Therefore the angle from the mobile device 415 to the location of the point of light is known. The angle from camera 403 to the location of the point of light can be calculated by detecting the pixel (or group of pixels) of the point in the image. The distance to the point of light can be triangulated, from which the distance of the mobile device 415 to the insect can be estimated, since the insect is often on the same surface as the point of light.

In some embodiments, mobile device 415 may include a projector to project a beam of a form of energy to vicinity of the insect, to create the point of light and/or to handle the insect. Additionally, mobile device 415 may include an additional camera (e.g., camera 503 in FIG. 5). The direction and/or distance of the mobile device 415 from an insect may be calculated (e.g., as described above) using the projector and/or additional camera of the mobile device 415.

Once within the predetermined distance, mobile device 415 may use a member, possibly extendable from the device to the vicinity of the insect, e.g., to handle the insect, as described below.

In FIG. 4B, the auxiliary device is attached to housing 401 at attachment point 411 and may be in communication with a power source and/or reservoir within housing 401, via attachment point 411. The auxiliary device may include a handling tool, such as a moveable and typically extendible member 426, such as a telescopic arm. Member 426 may be controlled by processor 402 to extend from the housing 401 and move to the location of the insect to handle the insect at the location, for example, to capture or kill the insect, as described below.

In some embodiments member 426 is a telescopic and/or deformable arm or spring made of, for example, shape memory material that is usually in a folded or coiled form and can be extended and moved to interact with the insect at the location of the insect, upon a signal from processor 402.

Handling the insect may include using mechanical and/or chemical methods. In some cases, both mechanical and chemical means or methods are used to handle the insect.

In some embodiments, member 426 serves as a conduit for instruments or agents used to handle the insect. For example, member 426 may include or may be in communication with a chamber containing a chemical substance (e.g., in the form of gas, liquid or powder) that can be sprayed at or dropped on the insect from a relatively close range, thereby limiting the effect of the chemical substance to the insect itself and not affecting the surrounding space. In one example, the chamber may contain a pesticide. In another example, the chamber may include a repellant such as citronella oil, which is a plant-based insect repellent.

In some embodiments, housing 401 includes a reservoir of the chemical substance. In other embodiments housing 401 stores capsules (or other containers) of the chemical substance, which can be loaded into the member 426.

In one embodiment, member 426 may include a nozzle attached to the distal end 427 of member 426. The member 426, carrying a nozzle, may be directed to the location of the insect and a pulse or spray of a chemical substance (e.g., as described above) may be directed at the insect at close range via the nozzle.

In one embodiment, member 426 may include or may be in communication with a suction chamber to draw in and capture (and/or kill) the insect.

In another embodiment, member 426 may include an electrifying element by which to electrocute the insect. In another embodiment member 426 may include an adhesive element by which to capture (and/or kill) the insect.

Other electrical and/or mechanical and/or chemical solutions may be employed via member 426.

Member 426 does not have human or other predator characteristics and is therefore typically not identified by insects (such as mosquitoes) as humans or predators and can thus approach the insect and get within close range of the insect without scaring it off.

In some embodiments, an auxiliary device may include, for example, a projector (e.g., in addition to projector 108) to project a beam of any form of energy harmful or lethal to the insect to the location of the insect. In some embodiments a single projector (e.g., projector 108) may be used to indicate a location of an insect and to project a beam to handle (e.g., incapacitate) the insect. Thus, a projector may be controlled by a signal generated from processor 102 to project a beam of a form of energy such as light, heat, and the like, to the location of the insect, to handle the insect.

In some embodiments, neural networks, such as convolutional neural networks, or other computer vision software and algorithms are used to detect and identify details of the insect from an image or a plurality of images of the location. For example, shape and/or motion and/or color detection algorithms may be used to determine the shape and/or color and/or movement pattern and/or other details of the insect. Movement pattern may include, for example, direction of movement, size of movement, velocity of movement, etc. These details of the insect may be used to determine a type of insect being imaged and/or differentiate between different insects and/or between an insect and non-insect objects, such as particles of dust or other noise that may be imaged.

In some embodiments, processor 102 controls the auxiliary device based on the determination of the type of insect. For example, a projector may be controlled to handle the insect only if it is a specific type of insect.

In other embodiments, an auxiliary device may include, for example, a tool to enhance the image of the room at the location of the insect. For example, the system (e.g., 100) may include a camera (e.g., in addition to camera 103) with optics to enable enhancing the location of the insect, for example, to confirm the existence and/or type of insect at the location, based on an enlarged image of the location.

In one embodiment, a long focus lens (e.g., telephoto lens) may be used to zoom-in on the location of the insect to enable seeing the shape or other details of the insect in better detail and focus.

In one embodiment, once camera 103 detects a location of a suspected insect, the additional camera may be directed and/or moved to the location of the suspected insect, for example, to confirm the existence and/or type of insect. In one embodiment a camera with a long-focus lens (or other enlarging optics) may be attached to or located on indicator directing device 312, e.g., on a gimbal, such that the enlarging optics can be moved in parallel to the indicator directing device, automatically directing the optics at the location of a suspected insect.

In one embodiment, differential analysis may be used to confirm a suspected insect and/or to detect an insect. For example, an area may be scanned at low resolution to detect a suspected insect, and the area of the suspected insect may then be analyzed at high resolution, e.g., to confirm the existence and/or type of insect. Using differential analysis of images enables to reduce processing, thereby providing a cost effective solution.

Thus, in one embodiment, camera 103 may obtain a wide FOV image of the room and an auxiliary device, such as an additional camera that enables zooming-in, obtains a detailed image of a portion of the room. Processor 102 can detect a location of a suspected insect in the wide FOV image of the room, direct the additional camera to the location of suspected insect (e.g., by controlling movement of the gimbals) and confirm the insect (e.g., confirm the existence and/or type of insect) in the detailed image of the portion of the room (the location of the suspected insect).

In one embodiment, a system for handling an insect, such as system 100, may include an auxiliary illumination source to allow higher resolution imaging of a location of a suspected insect and to assist in confirming the insect. Optionally, an illumination source, which may also be attached to the gimbal such that it is moved in parallel to the indicator directing device, may be used, e.g., to obtain a brighter image. The illumination source may have a relatively short wavelength (e.g. blue light) so as to reduce the diffraction limit and allow higher resolution imaging of the suspected insect. In some embodiments, the illumination source and the location indicator are the same element.

Once a suspected insect is confirmed, processor 102 can control projector 108 to indicate the location of the confirmed insect and possibly control another auxiliary device to eliminate or otherwise handle the confirmed insect.

Using an auxiliary device, such as an additional camera and/or additional illumination source, enables obtaining an enhanced image via optics and/or illumination and relying less on power consuming computer vision algorithms. Thus, a less powerful CPU may be used with camera 103, thereby providing a cost effective solution.

In some embodiments a single camera (e.g., camera 103) may be used to provide images from which to detect a location of an insect or suspected insect and to magnify or otherwise enhance the image at the detected location. For example, one optical element may be employed to image a large area (e.g., a room) and another optical element may be employed to image a small area within the large area (e.g., the detected location within the room). Alternatively or in addition, differential analysis may be used to locally enhance regions within an image of a large area, for example, to assist in identifying an insect. The tool to enhance the image of the room at the location of the insect, may be controlled by processor 102.

Figure 4C:
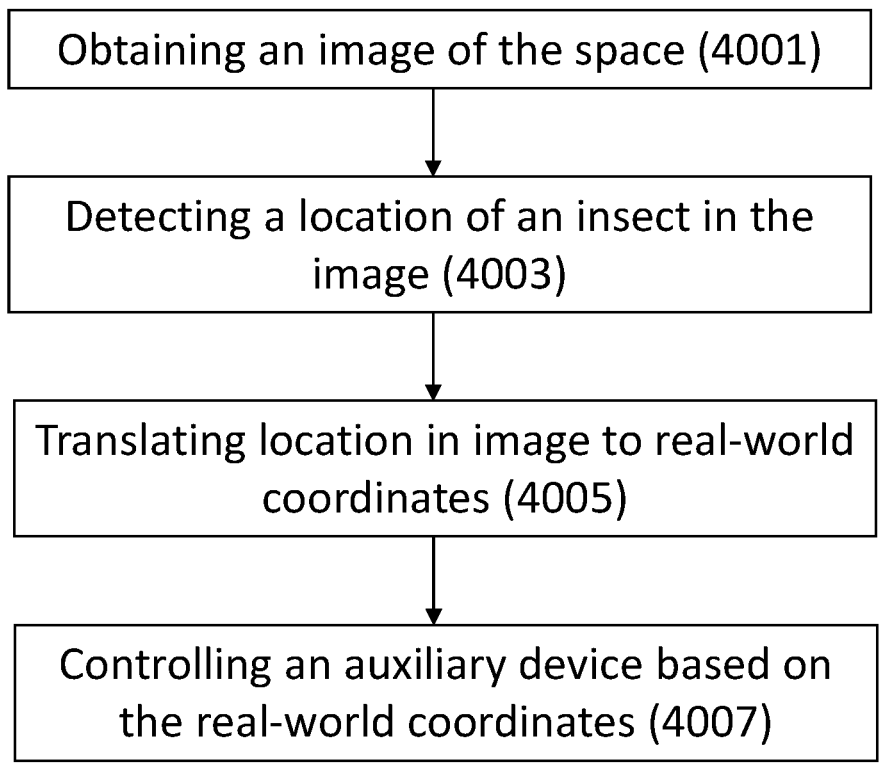
FIG. 4C is a schematic illustration of a method for controlling an auxiliary device for handling an insect, according to an embodiment of the invention.

In one embodiment, which is schematically illustrated in FIG. 4C, a method, some steps of which may be carried out by processor 402, for eliminating, incapacitating or otherwise handling an insect, includes obtaining an image of a space (4001) and detecting a location of an insect in the image (4003). The location of the insect in the image is translated to real-world coordinates (4005). Processor 402 (or another processor) then controls an auxiliary device (such as independently mobile device 415 or member 426) based on the real-world coordinates. For example, the auxiliary device can be directed to the real-world coordinates (4007).

In some embodiments, an auxiliary device is only employed to eliminate or otherwise handle an insect if it is determined that there are no other susceptible objects that can be harmed by the action of the auxiliary device. Susceptible objects may include, for example, living beings (e.g., humans, pets, etc) and/or other objects or materials, such as paper or fabric or objects including such materials that can be harmed by the action of the auxiliary device.

Thus, a method for eliminating an insect may include a step of determining if there is a living being (or object or material that may be harmed by the action of the auxiliary device) in the vicinity of the location of the insect and directing the auxiliary device at the real-world coordinates detected in step (4005) only if no living being (or object or material) is detected in vicinity of the insect. Existence of a living being in vicinity of location of the insect may be determined, for example, by, determining motion in the space. Motion above a predetermined size may indicate a person or other living being in the space. In one embodiment motion or a size of motion is determined by detecting changes over time in the images of the space.

In other embodiments, existence of a person or other living being (or specific object or material) in the space may be determined by using computer vision techniques, e.g., to detect from the image (e.g., an image obtained by camera 103 or an additional camera) a shape, color or other attribute of a person or object or material.

Thus, in some embodiments a system for eliminating an insect in a room includes a camera to obtain an image of the room and a processor to detect a location of the insect in the image of the room. For example, the processor detects, from the image of the room, an insect after alighting and/or an insect on a surface in a space. The processor may then translate the location of the insect (e.g., the insect after alighting) in the image to real-world coordinates and control an auxiliary device based on the real-world coordinates to eliminate or otherwise handle the insect.

Alternatively or in addition, the processor may determine if there is a person (or other living being) or specific susceptible object or material, in vicinity of the insect and may control the auxiliary device to eliminate or otherwise handle the insect based on the determination.

Alternatively or in addition, the processor may confirm the existence and/or type of the insect at the location and may control the auxiliary device to eliminate or otherwise handle the insect based on the confirmation of the existence and/or type of the insect at the location. In one example, the processor may control the camera or an additional camera to obtain an enlarged or more detailed image of the insect to confirm the existence and/or type of the insect at the location.

The control of the auxiliary device, which may be via wireless communication, can be, for example, control of a propulsion mechanism of the auxiliary device and/or control of a handling tool of the auxiliary device.

An example of an auxiliary device, which is independently mobile, is schematically illustrated in FIG. 5.

In one embodiment device 515 is a flying device (e.g., drone) which includes a propulsion mechanism 525 to move the device without assistance and an insect handling tool 526, or, alternatively or in addition, including an attachment point configured to releasably receive and secure a handling tool to the device 515.

Handling tool 526 may apply mechanical and/or chemical and/or electrical methods by which to handle an insect. In some embodiments the handling tool 526 applies both mechanical and chemical means or methods by which to handle the insect.

In one embodiment handling tool 526 may include a suction chamber to draw in and capture (and/or kill) the insect. In another embodiment, handling tool 526 may include an electrifying element by which to electrocute the insect. In another embodiment handling tool 526 may include an adhesive element by which to capture (and/or kill) the insect. Other electrical and/or mechanical solutions may be employed by handling tool 526.

In one embodiment handling tool 526 may include, for example, a telescopic arm or deformable arm or spring made of, for example, shape memory material that can be in a folded or coiled form while device 515 is in transit and can be extended to interact with the insect upon a signal from processor 402.

In another embodiment handling tool 526 may include a chamber containing a chemical substance (e.g., as described above) that can be sprayed at or dropped on the insect from a relatively close range, thereby limiting the effect of the chemical substance to the insect itself and not effecting the surrounding space.

In some embodiments, port 413 includes a reservoir of the chemical substance to enable the device 515 to dock at the port, recharge and stock the handling tool 526 with the chemical substance. In other embodiments port 413 stores capsules (or other containers) of the chemical substance. A capsule can be loaded into the handling tool 526 while the device 515 is docking at port 413. A capsule may last several events of handling insects before being depleted, and may be replaced at port 413 when depleted.

In some embodiments, device 515 may include a combination of different handling tools and may use a combination of methods (e.g., chemical and/or mechanical) for handling insects.

Device 515 does not have human or other predator characteristics and is therefore typically not identified by insects (such as mosquitoes) as a human or predator and can thus approach the insect and get within close range of the insect without scaring it off.

In the example in FIG. 5, device 515 is an aerial drone and the propulsion mechanism 525 includes a propeller mechanism suitable for aerial flight. Different types of independently mobile devices may have different types of propulsion mechanisms, or multiple types of propulsion mechanisms. For example, a terrestrial drone may have a propulsion mechanism that includes a motor, transmission, and wheels.

Device 515 typically includes a control circuit (not shown) in communication with a processor (e.g., processor 402) and is configured to receive input regarding location of an insect.

In some embodiments, device 515 (and/or member 426) may further include one or more sensors such as an image sensor (e.g., camera 503) and/or a distance sensor (such as a rangefinder).

In one embodiment device 515 (and/or member 426) is controlled to handle a stationary insect or an insect after alighting (e.g., an insect on a surface in a space). The device 515 or member 426 receives direction information (e.g., a vector) from processor 402, based on the detected location of the stationary insect and is propelled according to the received information. A distance sensor in device 515 (or member 426) can detect the distance of the device 515 (or member 426) from the insect (and/or from the surface) and stop propelling at a predetermined distance from the insect.

In one embodiment device 515 (and/or member 426) may include a signal source (such as a light source or audio transmitter) to emit a signal that can be received and analyzed by processor 402 and may be used to estimate or calculate the distance of the device 515 or member 426 from the insect (and/or from the surface). For example, device

515 may include a projector to project a visible mark to the vicinity of the insect. Processor 402 can then control the device 515 (e.g., to control handling tool 526) or member 426 based on the calculated distance.

In some embodiments a dedicated image sensor attached to or within housing 401 can be used to capture an image of the insect (and possibly of the visible mark projected from a projector of device 515), which may be used to direct the device 515 or member 426 to the insect. The visual mark can be detected from an image obtained by camera 403 or by the dedicated camera and device 515 or member 426 and can thus be directed to the location of the visual mark as imaged.

Using a device and/or extendable member controlled by a processor based on a location of an insect in an image, according to embodiments of the invention, enables accurate and environment friendly action to remove or eliminate pests such as flying insects.

As described above, embodiments of the invention can distinguish an insect from noise, such as, electronic noise on the image sensor and/or ambient noise, such as dust particles in the space, variations in ambient illumination, reflections, etc. Additionally, a specific insect type (e.g., mosquito) can be differentiated from another insect type (e.g., fly).

In one embodiment, a method is provided for differentiating between a target insect and a non-target insect object from images of a space. For example, a target insect may be an insect, as opposed to a non-insect object (e.g., noise or other object) and/or a specific type of insect, as opposed to a different type of insect.

The method, which may be carried out by a system such as system 100, includes using multiple images to determine if an object in an image is a target insect.

In one embodiment, processor 102 may detect an object by comparing two (or more) images of the space and may determine that the object is a target insect based on a characteristic of the object in an image of the space. In some embodiments, an object is detected if it fulfills a predetermined criterion.

In one embodiment, camera 103 may capture an image (also named "current image"), from which it is desirable to determine if an insect is present in the space. Processor 102 may obtain a subtraction image by subtracting the current image of the space from a different, second, image of the space. The subtraction image highlights changes in the space since objects that have not changed (e.g. have not moved or have not changed position) in between images, do not typically show up in the subtraction image.

Processor 102 may detect in the subtraction image an object having a predetermined criterion and determine that the object is a target insect.

As described above, a device may be controlled based on the determination that an object is a target insect.

In an embodiment of the invention, two or more images of the space are compared, in order to detect an object which fulfills a predetermined criterion. For example, a current image may be compared to a second image that was previously captured, to detect an object that is present in the current image but not in the previous image. In some embodiments, the second image may include a representation of a plurality of images of the space. For example, the second image may be an average (or other suitable statistical representation) of multiple images of the space. In another example, the second image may include a background image constructed using images of the space captured over time, by understanding constant and temporary elements in the images of the space, and constructing an image of the constant elements (e.g. walls and furniture, but not people and pets).

Figure 6:
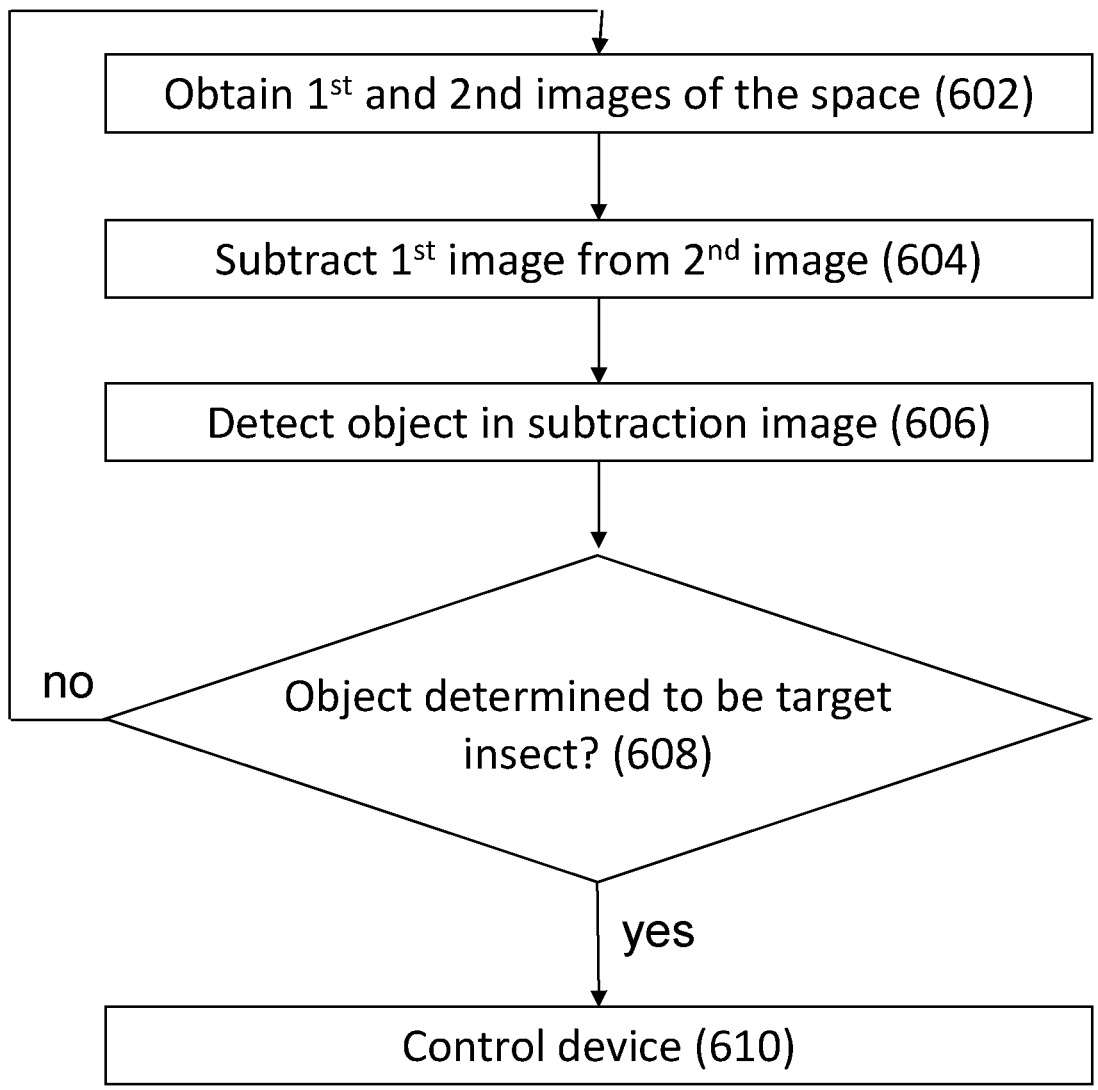
FIG. 6 is a schematic illustration of a method for detecting an insect in images of a space, according to an embodiment of the invention.

An example of this embodiment is schematically illustrated in FIG. 6. Two images of a space are obtained (step 602). In one example, the images are compared by subtraction, e.g., a current image, is subtracted from another image of the space to obtain a subtraction image (step 604).

In step 606, an object fulfilling a predetermined criterion is detected in the subtraction image. A predetermined criterion may relate to one or more characteristics of the object. For example, a characteristic of the object may include size, shape, location in the subtraction image, color, transparency and other such attributes of the object in the subtraction image. Thus, a predetermined criterion may be, for example, a size range (e.g., in pixels), a specific shape (e.g., as determined by a shape detection algorithm applied on the subtraction image), a specific location or range of locations of the object within the subtraction image, specific colors (e.g., as determined by applying a color detection algorithm on the subtraction image), etc.

Processor 102 determines if the object fulfilling the predetermined criterion is a target insect. For example, one or more characteristics of the object (such as, movement pattern, shape, color or transparency) may be determined and the object may be determined to be a target insect based on the determined characteristic. For example, mosquitoes are more transparent and are of lighter color than some other common insects, thus, in one example, in which the target insect is a mosquito, if the color of the pixels associated with the object are colors typical of mosquitoes the object would be determined to be a mosquito. In another embodiment, if an object is determined to have a certain level of transparency or to have a predetermined pattern of transparent areas, it may be determined to be a mosquito. Transparency of an object may be determined, for example, based on a known color of background in the space. If an object is determined to have the color of the background (e.g., if the background color is not a color typical of the target insect), the object may be determined to be partially transparent. In another example, different insects have different shapes, thus a target insect may be determined based on its shape in the subtraction image.

In some embodiments, an object may be detected from a plurality of images whereas detecting if the object fulfills a predetermined criterion and determining that the object is a target insect, are done from a single image. In one embodiment, a same characteristic of an object may be used to detect an object fulfilling a predetermined criterion, in a first image and to determine if the object is a target insect, in the same image or in a second image. In other embodiments, different characteristics are used to detect an object fulfilling a predetermined criterion in a first image and to determine if the object is a target insect in the same image or in a second image.

For example, a subtraction image may include several objects but only two that are within a predetermined size range. Thus, two objects are detected in the subtraction image. One or more characteristic(s), other than size, may be determined for the two objects, e.g., the color and/or transparency and/or movement pattern of the two objects may be determined and the objects may be determined to be target insects or not, based on their color and/or transparency and/or movement pattern.

In some embodiments, a high resolution image of the object may be obtained and the object can be determined to be a target insect based on the high resolution image. For example, an object may be detected in a first image, e.g., in a subtraction image, possibly, based on its size or other characteristic, and may then be determined to be a target insect (or not) from a second image which is of higher resolution than the first image.

In some embodiments, characteristics, such as color and/or movement may be spatially correlated. For example, if a number of pixels that are close to each other have properties indicative of a target insect, these pixels may be given more weight in determining the presence of a target insect, than a number of pixel having the same properties, but which are not closely grouped. In another example, several correlated characteristics or pixel properties e.g., same movement patterns and/or changes in illumination, detected in several locations in an image, may point to movement of a larger object and/or reflections, and may be assigned a lower weight in determining the presence of a target insect, than single and uncorrelated characteristics.

Different weights may be assigned to characteristics (or pixels representing these characteristics) based on the behavior of the characteristic in a plurality of images. For example, a characteristic persisting over time is less likely to be noise and may therefore be assigned a higher weight.

Machine vision techniques, such as object detection algorithms, segmentation, etc., may be used to detect an object in images of the space (e.g., a subtraction image) and to determine the pixels associated with the object. In some embodiments, a learning model may be applied on images of the space to determine that the object is a target insect. A learning model may be applied, for example, on the subtraction image to detect an object having a predetermined criterion and/or on a current image to determine if the object is a target insect. A learning model may be applied at other steps as well, such as integrating the various inputs (color, transparency, size, movement pattern, etc.) into a single decision of determining whether the object is a target insect.

If the object is determined to be a target insect (step 608), processor 102 generates a signal to control a device (step 610). If the object is not determined to be a target insect, another current image is obtained and processed.

A device controlled based on the determination that an object is a target insect may include an auxiliary device, e.g., as described above. In one example, a device (such as a projector of a light source) may create a location indicator visible to a human eye (e.g., visual mark 115). Thus, a method may include determining a real-world location of the target insect from the images of the space and controlling a device to create a location indicator visible to a human eye and indicative of the real-world location of the target insect.

In another embodiment, a device may be used to eliminate and/or otherwise handle target insects. Thus, a method may include determining a real-world location of the target insect from the images of the space and controlling a device to eliminate (or otherwise handle) the target insect at the real-world location. The device may include an auxiliary device for handling an insect, e.g., as described above. For example, the device may include a projector to project a form of energy at the real-world location of the target insect. Alternatively or in addition, the device may include a remotely controlled independently mobile device and/or a telescopic arm and/or nozzle.

In one embodiment, an object (e.g., the object detected in a subtraction image) is tracked in multiple images of the space and to multiple locations in the space, and the object may be determined to be a target insect (or not) based on the tracking.

Figure 7:
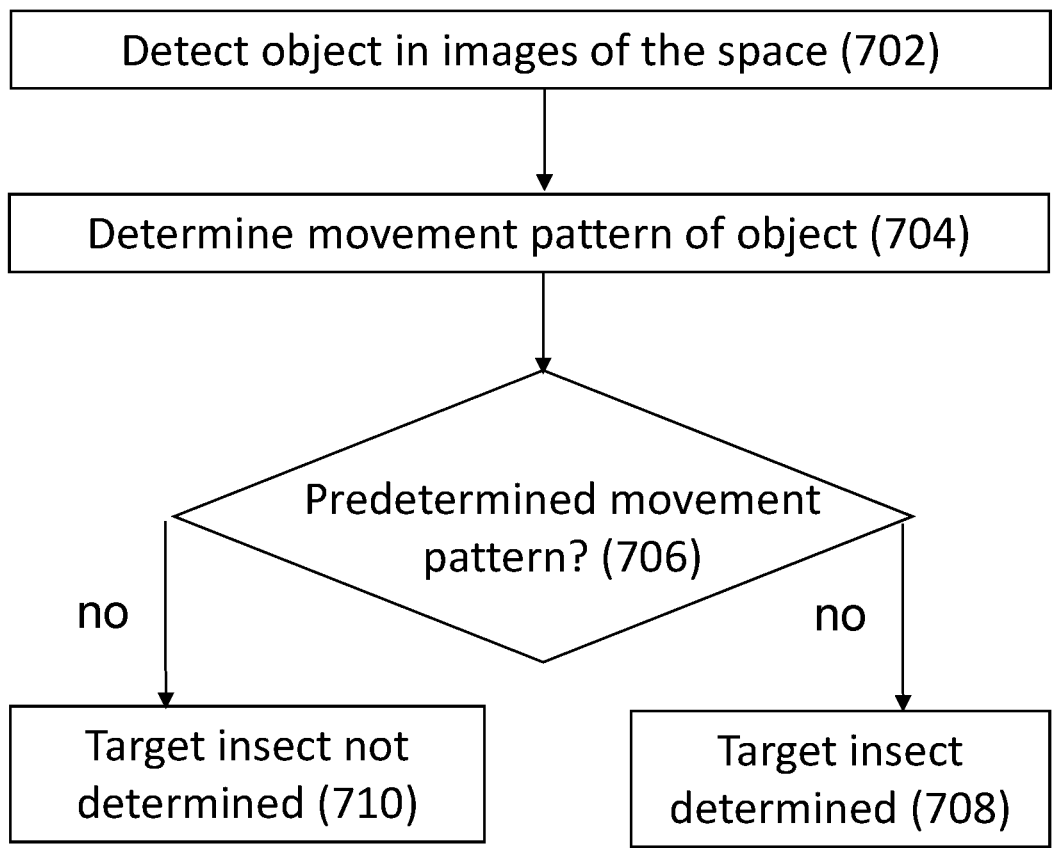
FIG. 7 is a schematic illustration of a method for determining if an object in an image is an insect, according to an embodiment of the invention.

In one embodiment, which is schematically illustrated in FIG. 7, a movement pattern of an object is detected and the object is determined to be a target insect (or not) based on the movement pattern.

An object is detected in images of a space (step 702) and a movement pattern of the object is determined (step 704). If the movement pattern is similar to a predetermined pattern (step 706) then the object is determined to be a target insect (step 708). If the movement pattern is not similar to the predetermined movement pattern (step 706) then the object is not determined to be a target insect (step (710).

Typically, a predetermined movement pattern will be a pattern consistent with a pattern expected from the target insect. For example, a predetermined movement pattern can include an alighting pattern (e.g., flying and then settling down), which is typical of mosquitoes. In another example, the predetermined movement pattern can include predominantly a non-repetitive movement, since a predominantly repetitive motion is characteristic of an unintended motion (such as movement of a fan, wind-blown objects and/or electronic noise). In yet another example, a movement pattern can include a change in direction and a predetermined movement includes a change in direction at a specific angle or range of angles. For example, mosquitoes often change direction at an angle less sharp than flies. Thus, a predetermined movement pattern may include a change of direction at an angle in a predetermined range. In another example, mosquitoes move more slowly than flies, thus, a predetermined movement pattern can include a specific velocity (or range of velocities).

Additionally, determining characteristics of objects, such as color and transparency, may be more accurate when using multiple images and/or comparing images over time. In some cases, over time, a moving object (such as an insect) may pass over different backgrounds, assisting in determining the color and/or transparency of the object (as described above). For example, a completely opaque object would not change its color or intensity when passing over different backgrounds, while a translucent one would.

In some embodiments, historical data may be used in determining if an object is a target insect. For example, determining if an object in a later captured image is a target insect, can be based on a weight assigned to pixels in an earlier captured image.

Figure 8:
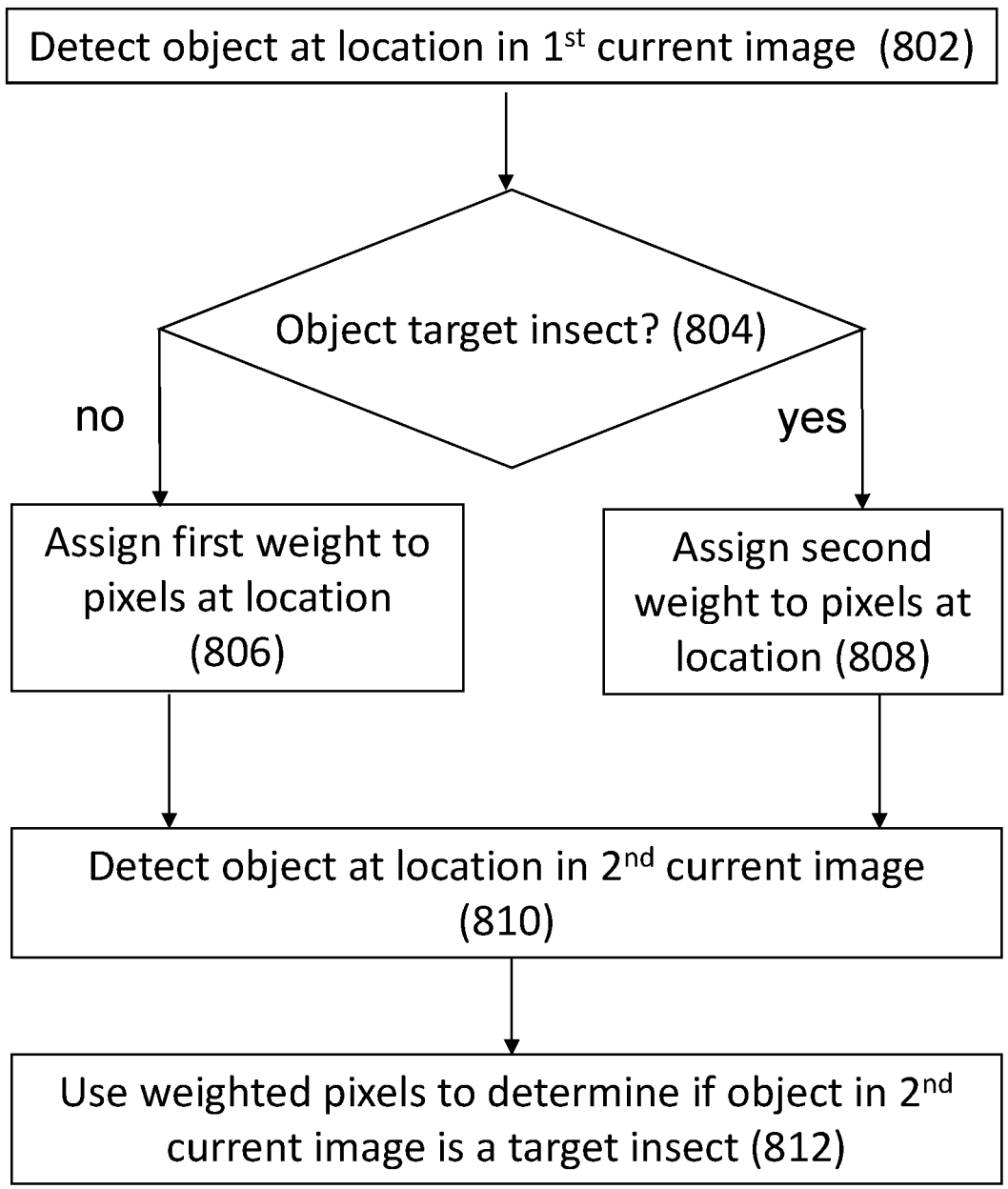
FIG. 8 is a schematic illustration of a method for determining if an object in an image is an insect based on prior images, according to an embodiment of the invention.

In one example, which is schematically illustrated in FIG. 8, an object is detected at a location in a first image (e.g., first current image) of a space (step 802). If it is determined that the object is not a target insect (step 804), then a first weight is assigned to pixels at that location (step 806). If it is determined that the object is a target insect (step 804), then a second weight is assigned to pixels at that location (step 808).

An object is detected at a location in a second image (e.g., a second current image) (step 810) and the weights from steps 806 and 808 are assigned to the pixels of the second image based on their location in the second image. The object in the second image may then be determined to be a target insect (or not) based on the weighted pixels associated with the object in the second image (step 812).

For example, images of a space (such as a room) may include windows, a TV screen, a fan, reflections and more, which may create "noisy" areas in the images. Such noise may be detected, for example, by high variation in pixel values over time, by many false positives (e.g., falsely detected target insects), or by applying object detection algorithms to identify the objects likely to create noise (e.g., window, TV, etc.). In some embodiments, characteristics of objects (or pixels representing these characteristics) detected in relatively "noisy" areas of an image may be assigned less weight than characteristics (or pixels) of objects detected in other areas of the image. In another example, characteristics (or pixels) of objects detected in an area of the image, in which a target insect was erroneously determined in past cases, may be assigned less weight than characteristics (or pixels) detected in other areas of the image.

What is claimed is:

1. A method for detecting a target insect in a space, the method comprising:
   using a computer processor that is in communication with a camera and a device, to receive images of the space, the images captured by the camera,
   detect an object by applying an object detection algorithm on the images of the space,
   track the object in multiple images of the space to multiple locations in the space,
   based on the tracking detect an alighting movement pattern of an insect,
   determine that the object is a target insect based on the detection of the alighting movement pattern,
   determine a location of the target insect in an image of the space, after alighting, and
   in accordance with the determined location of the target insect after alighting, control the device, to perform a pest control related task at the location of the target insect after alighting.

2. The method of claim 1 wherein the object fulfills a predetermined criterion relating to one or more characteristic of the object, the characteristic comprising at least one of: size, shape, location in an image, color and transparency.

3. The method of claim 1 comprising obtaining a subtraction image by subtracting a current image of the space from a second image of the space by the processor, and comprising using the processor to detect in the subtraction image an object fulfilling a predetermined criterion.

4. The method of claim 1 comprising:
   obtaining a high-resolution image of the object; and
   using the processor to determine that the object is a target insect based on the high-resolution image.

5. The method of claim 1 comprising:
   using the processor to detect spatially correlated characteristics of the object, and
   to determine if the object is a target insect based on the spatially correlated characteristics.

6. The method of claim 1 comprising:
   using the processor to determine a real-world location of the target insect from images of the space, and
   to generate a signal to create a location indicator visible to a human eye and indicative of the real-world location of the target insect.

7. The method of claim 1 comprising:
   using the processor to determine a real-world location of the target insect from images of the space, and
   to generate a signal to control a device to eliminate the target insect at the real-world location.

8. The method of claim 7 wherein the device comprises a remotely controlled independently mobile device.

9. The method of claim 7 comprising:
   using the processor to determine from the images of the space if there is a living being in vicinity of the target insect, and
   to control the device to eliminate the target insect at the real-world location based on a determination by the processor if there is a living being in vicinity of the target insect.

10. The method of claim 1, wherein the device is an autonomously mobile device, the method comprising:
    using the processor to determine a real-world location of the target insect from images of the space, and
    to control the device to move to vicinity of the real-world location of the target insect.

11. A system for detecting a target insect in a space, the system comprising:
    a camera to obtain images of the space; and
    a processor in communication with the camera and with a device, the processor to detect an object by comparing at least two of the images of the space,
    track the object in multiple images of the space to multiple locations in the space,
    detect from the tracking an alighting movement pattern of an insect,
    determine that the object is a target insect based on the detection of the alighting movement pattern,
    determine a location of the target insect in an image of the space, after alighting, and
    control the device to perform a pest control related task at the location of the target insect after alighting, based on determination by the processor that the object is a target insect and based on the location of the target insect in an image of the space, after alighting.

12. A system for handling an insect in a space, the system comprising:
    a camera to obtain images of the space;
    a device separately mobile from the camera; and
    a processor to track an object in multiple images of the space to multiple locations in the space, detect an alighting movement pattern of an insect based on the tracking, determine a location of the insect in an image of the space, after alighting, and to control the device to move to vicinity of the location of the insect after alighting.

13. The system of claim 12 wherein the processor controls the device to move to vicinity of the insect, based on analysis of an image of the space having the insect and the device within a same frame.

14. The system of claim 12 wherein the processor estimates a distance of the device from the insect and wherein the processor controls the device to move to a predetermined distance from the insect.

15. The system of claim 14 wherein the processor controls the device to eliminate the insect when the device is at the predetermined distance from the insect.

16. The system of claim 12 comprising a docking station for powering and/or loading the device.

17. The system of claim 12 wherein the device is configured to eliminate the insect electrically, mechanically or chemically.

18. The system of claim 17 wherein the device comprises a suction chamber to draw in the insect.

* * * * *